(12) United States Patent
Yoshida

(10) Patent No.: US 8,878,964 B2
(45) Date of Patent: Nov. 4, 2014

(54) IMAGE CAPTURE APPARATUS

(75) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 13/371,224

(22) Filed: Feb. 10, 2012

(65) Prior Publication Data

US 2012/0206613 A1 Aug. 16, 2012

(30) Foreign Application Priority Data

Feb. 15, 2011 (JP) ................................. 2011-030012
Mar. 25, 2011 (JP) ................................. 2011-067811

(51) Int. Cl.
*H04N 5/217* (2011.01)
*G03B 13/36* (2006.01)
*H04N 5/232* (2006.01)
*G03B 19/12* (2006.01)

(52) U.S. Cl.
CPC .............. *G03B 13/36* (2013.01); *H04N 5/2171* (2013.01); *G03B 19/12* (2013.01); *H04N 5/23209* (2013.01); *H04N 5/23212* (2013.01)
USPC ........................................................ 348/241

(58) Field of Classification Search
USPC .............................. 348/207.99, 241, 345, 349
See application file for complete search history.

(56) References Cited

U.S. PATENT DOCUMENTS

| 8,013,933 B2 * | 9/2011 | Sugihara ........................ 348/375 |
| 8,218,035 B2 * | 7/2012 | Gyotoku ........................ 348/241 |
| 2005/0068448 A1 | 3/2005 | Steinberg | |

FOREIGN PATENT DOCUMENTS

| CN | 101001319 A | 7/2007 |
| CN | 101388959 A | 3/2009 |
| CN | 101622861 A | 1/2010 |
| JP | 2952215 B2 | 9/1999 |

* cited by examiner

*Primary Examiner* — Tuan Ho
(74) *Attorney, Agent, or Firm* — Canon U.S.A, Inc., IP Division

(57) ABSTRACT

An image capture apparatus including a detecting unit configured to detect focus detecting system dust, and a controller configured to perform control so that captured image information is stored in a memory, wherein the controller performs control so that information about the detected focus detecting system dust is stored in the memory.

5 Claims, 15 Drawing Sheets

IMAGE CAPTURE APPARATUS

BACKGROUND OF THE INVENTION

1. Field of the Invention

The present invention relates to an image capture apparatus having a function of detecting dust in a focus detecting optical system.

2. Description of the Related Art

Hitherto, in a phase difference type automatic focus (AF) detecting device of an ordinary interchangeable single-lens reflex camera system, two images formed with subject luminous fluxes passing through two exit pupil regions that are different from each other of an interchangeable lens are received with a line sensor pair and subjected to photoelectric conversion. Further, the method of detecting the out-of-focus amount, that is, the defocus amount of the interchangeable lens by obtaining the relative position displacements of image signals which are the outputs of the photoelectric conversion is commonly used.

In that case, the line sensor pair extracts only the luminance distribution of a specified region of the subject space. Accordingly, it is difficult to determine the defocus amount of a subject having no luminance distribution in the region. Therefore, the method of enabling the focus detection for plural subjects by preparing a plurality of line sensor pairs and the focus detecting optical systems corresponding thereto, and extracting the luminance distributions of a plurality of subject regions has been proposed. Further, the method of arranging line sensor pairs in each region so that the line sensor pairs intersect in the vertical direction and the horizontal direction of the photographic screen (hereinafter referred to as the cross phase difference AF) has also been proposed.

More specifically, a cross phase difference type automatic focus detecting optical system will be described with reference to FIG. 13. In FIG. 13, the focus detection is enabled only in the region corresponding to the center of a photographic screen for the sake of simplicity, and line sensors pairing off with each other of the phase difference type AF are arranged in the region so as to intersect in the vertical direction and the horizontal direction of the photographic screen. Therefore, the total number of the line sensor pairs is two. For an automatic focus detecting device which is more commonly used, the method of increasing the detection precision by arranging a plurality of line sensor pairs in the same direction in addition to the cross phase difference type AF, and arranging the pixels of the line sensor pairs so that the pixels are displaced with respect to each other by as much as half a pixel (staggered arrangement) has also been proposed.

The first advantage of the above-described configuration is that the repeatability error in focus detection can be reduced by averaging the results of the focus detection performed with the line sensor pairs. The second advantage of the above-described configuration is that the phase in/out phenomenon can be cancelled (reduced). Namely, the sensitivity of each of pixels included in the line sensor is not uniform so that the sensitivity of the pixel is high at its center and low at its edge. Accordingly, the phase state of a subject image formed on the line sensor is changed for a small movement within a single pixel range and the focus detection result is changed, which denotes the above-described phase in/out phenomenon.

Usually, the total line number of an actual phase difference type automatic focus detecting device is so large that several tens to several hundreds of line sensor pairs are provided.

Returning to FIG. 13, a field mask and a field lens are arranged on the optical axis of the interchangeable lens (capturing lens), so as to be near the scheduled focal plane of the interchangeable lens. Further, two pairs of secondary optical systems are arranged on the optical axis so as to be symmetric and orthogonal with respect to the optical axis. The field lens forms the exit pupil regions of the interchangeable lens on the secondary optical systems so that luminous fluxes passing through two vertically oriented regions are made incident on the vertical line sensor pair and those passing through two horizontally oriented regions are made incident on the horizontal line sensor pair, respectively.

When the focus of the interchangeable lens is achieved in front of the scheduled focal plane in the focus detecting optical system illustrated in FIG. 13, subject images formed on the line sensor pairs are close to each other. When the focus of the interchangeable lens is achieved behind the scheduled focal plane, the subject images are apart from each other. Since a specified function relationship is established between the relative position displacement amount of the subject image and the out-of-focus amount of the interchangeable lens, the defocus amount can be detected by performing an appropriate operation for each of output of the line sensor pairs.

The above-described focus detecting optical system can be ready for various subject patterns, because the line sensor pairs extract vertical and horizontal light amount distributions of the subject. More specifically, the line sensor achieves high focus detection precision for an intersecting contrast. Namely, the horizontal line sensor offers a high contrast for a subject such as a vertical line, and achieves high focus detection precision. On the other hand, the horizontal line sensor offers a low contrast or no contrast for a parallel contrast, that is, a subject such as a horizontal line, and achieves significantly low focus detection precision. Conversely, a subject such as a horizontal line becomes an intersecting contrast for the vertical line sensor, and high focus detection precision is achieved. Providing the cross phase difference AF allows for detecting focuses with stability irrespective of whether the subject is like a vertical line or a horizontal line.

Then, either a vertical defocus amount or a horizontal defocus amount is selected as a definitive defocus amount. Although many methods have been proposed to make the above-described selection, it is common practice to select the amount of a defocus caused in a direction in which the range ring position of the capturing lens becomes closer when the values of the contrast and reliability of the subject image signal are compared to specified threshold values and the values satisfy the specified threshold values.

In the past, airborne dust such as motes and particles was adhered to a main mirror or a sub mirror arranged on the optical path of an AF sensor or a focus detecting optical system (hereinafter referred to as the focus detecting system dust) at the time of mounting and demounting an interchangeable lens, and the focus detection precision was significantly decreased.

More specifically, the focus detecting system dust causes the image signal output of a given line sensor pair to be decreased as illustrated in FIGS. 15A and 15B where the vertical axis indicates the image output of the line sensor pair and the horizontal axis indicates the pixel position of the line sensor pair. When the focus detecting system dust is reflected in an image attained by the focus detecting optical system, the amount of a defocus caused in a direction in which the range ring position of the capturing lens becomes closer is detected even though a subject offers no contrast.

Accordingly, Japanese Patent No. 2952215 pays attention to the fact that a false defocus amount detected due to the focus detecting system dust is repeatedly detected no matter how much the focusing lens of the capturing lens is driven.

Japanese Patent No. 2952215 discloses the technology for determining the above-described state to be the adhesion of the focus detecting system dust and prohibiting the corresponding line sensor from performing the focus detection. However, in the known technology disclosed in Japanese Patent No. 2952215, when the camera detects the focus detecting system dust and removes the corresponding line sensor from the list of focus detection targets, the automatic focus adjustment can be performed with the other line sensors even though it is difficult for the camera to offer its original performance. Accordingly, the user recognizes the adhesion of the focus detecting system dust with difficulty.

In addition, even though the user is notified of the detection of the focus detecting system dust with a warning or the like, the user should have knowledge of the camera and special-purpose tools to remove the focus detecting system dust. Therefore, it is difficult for the user to remove the dust. Further, it is troublesome for the user to be warned of the detection every time the automatic focus adjustment is executed during the capturing operations even though it is difficult for the user to remove the dust.

Finally, a worker of a repair center has to apply uniform light with no contrast to the focus detecting system to confirm whether or not an image signal output from a specified pixel is decreased for each of the line sensors, so as to find the adhesion of the focus detecting system dust.

SUMMARY OF THE INVENTION

Accordingly, one aspect of the present invention provides an image capture apparatus that can notify a user or a worker of a repair center of information about detection of the focus detecting system dust.

An image capture apparatus according to an aspect of the present invention includes a detecting unit configured to detect focus detecting system dust, and a controller configured to perform control so that captured image information is stored in a memory, wherein the controller performs control so that information about the detected focus detecting system dust is stored in the memory.

Further features of the present invention will become apparent from the following description of exemplary embodiments with reference to the attached drawings.

DESCRIPTION OF THE EMBODIMENTS

Embodiments of the present invention will be described with reference to the following exemplary embodiments.

First Embodiment

Figure 1:
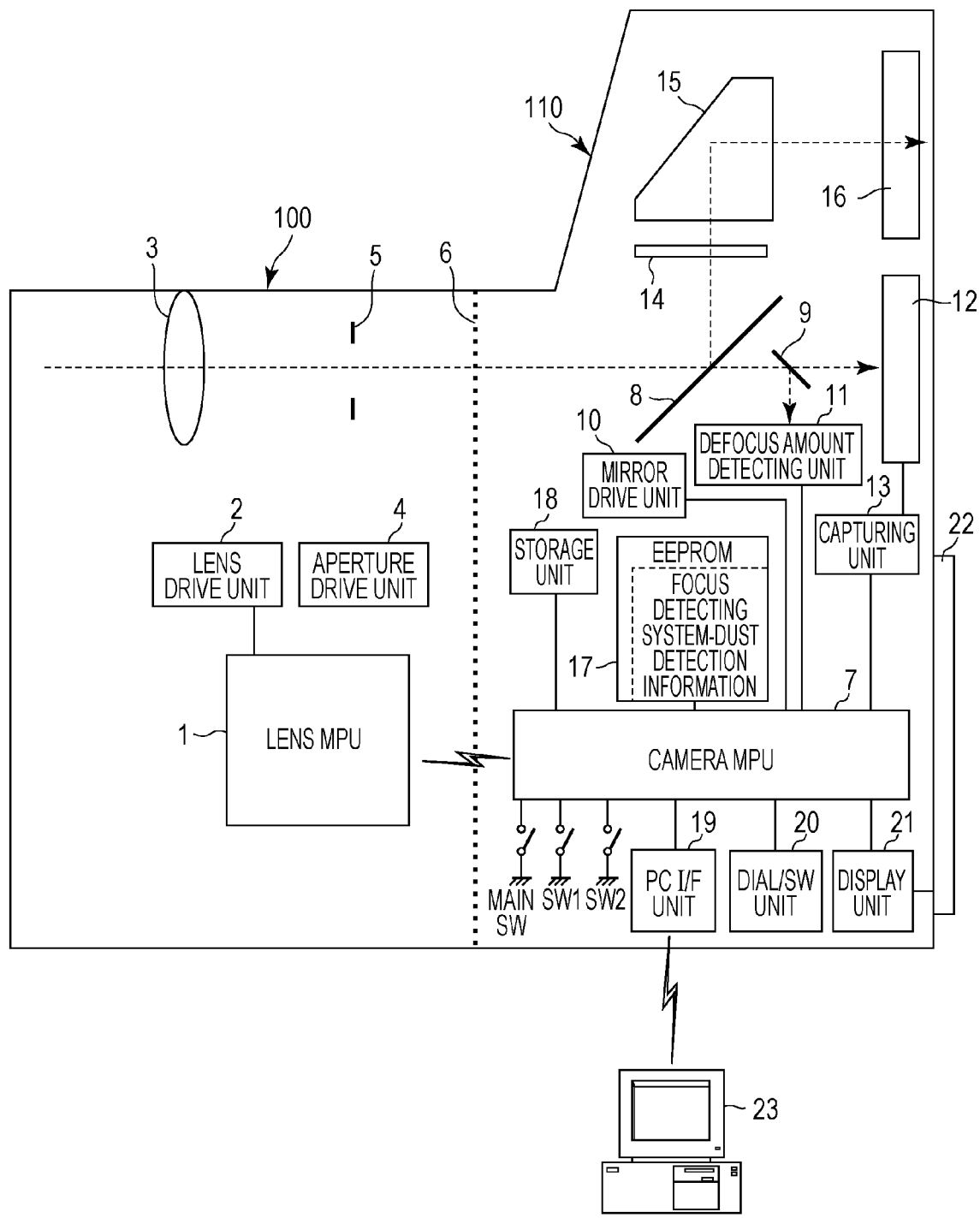
FIG. 1 is a block diagram illustrating a camera system according to a first embodiment of the present invention.

FIG. 1 is a block diagram illustrating an exemplary configuration of an interchangeable digital camera provided as an example of an image capture apparatus according to a first exemplary embodiment. FIG. 1 illustrates a lens microprocessing unit (MPU) 1 performing control related to an interchangeable lens 100, a lens drive unit 2 provided to drive the focusing lens of a capturing lens 3, and an aperture drive unit 4 provided to drive an aperture 5.

The interchangeable lens 100 includes the above-described lens MPU 1, lens drive unit 2, capturing lens 3, aperture drive unit 4, and aperture 5. Further, the interchangeable lens 100 is connected in a removable manner to a camera body 110 via a mount 6 as indicated by a dotted line illustrated in FIG. 1.

A camera MPU 7 performs control relating to the camera body 110. A main mirror 8 and a sub mirror 9 are further provided. A mirror drive unit 10 causes the main mirror 8 and the sub mirror 9, that are arranged on the optical axis at the image capturing time, to retract. A defocus amount detecting unit 11 performs photoelectric conversion for subject image data obtained with a focus detecting optical system (not shown), and outputs data of the photoelectric conversion result as a potential change. An imager (image capture element) 12 and a capturing unit 13 are further provided, where the capturing unit 13 generates captured image data via the imager 12. A focusing plate 14, a pentaprism 15, and a finder 16 are also provided.

An electrically erasable programmable read-only memory (EEPROM) 17 is provided for a nonvolatile memory, and corresponds to a storage unit storing information about the detection of the focus detecting system dust. A storage unit 18 stores captured image data in a removable memory card as a file. A personal computer (PC) interface (I/F) unit is connectable to a PC via a cable. When connected to the PC, the captured image file stored in the memory card inserted into the storage unit 18 can be copied or transferred to the PC by starting a special-purpose PC application from the PC. Further, the captured image file can also be copied or transferred to the PC by removing the memory card from the storage unit 18 and inserting the memory card into a card reader which is a PC peripheral device.

A dial/switch (SW) unit 20 is provided to set various camera settings (the shutter speed, the aperture value, the ISO speed ratings, etc.). A display unit 21 controls the display of the various camera settings or captured image data. Further, a display panel 22 displaying a display screen controlled with the display unit 21, and an external PC 23 are provided.

A main switch SW is turned on so that the camera MPU 7 and the lens MPU 1 are started and a camera system functions. A capturing preparation switch SW1 is turned on with a first stroke operation (half press) of a release button, and a release switch SW2 is turned on with a second stroke operation (full press) of the release button. A defocus amount which is an out-of-focus amount used to perform the automatic focus adjustment is calculated with the camera MPU 7 based on data output from the defocus amount detecting unit 11.

The defocus amount detecting unit 11 of the present embodiment detects, for discussion purposes only, a focus from the single focus detection region corresponding to the center of a photographic screen. A pair of line sensors provided for the phase difference autofocus is arranged in the focus detection region so that the line sensors intersect at right angles in the vertical direction and the horizontal direction of the photographic screen. That is, the total number of the line sensors is two.

When the capturing preparation switch SW1 is turned on, an automatic focus adjustment device operates. The camera MPU 7 reads data of subject images from the two line sensors of the defocus amount detecting unit 11 as potential changes, and compares the contrast or reliability of subject image signals to specified threshold values. When the contrast or reliability of the subject images signals satisfies the specified threshold values, a defocus amount is detected for each of the subject image signals. When the defocus amounts are respectively detected from the two line sensors, the amount of a defocus caused in a direction in which the range ring position of the capturing lens becomes closer is selected, so as to eliminate the result of detecting a defocus amount which may be affected by the contention between far and near subjects, which is caused by, for example, the reflection of the background. The camera MPU 7 transmits a drive instruction to the lens MPU 1 by communications based on the defocus amount, and the lens MPU 1 controls the lens drive unit 2 to drive the focusing lens.

During a normal focus adjustment operation, the detection of the defocus amount and the driving of the focusing lens are repeatedly performed. Accordingly, the defocus amount falls within the depth of field, which is determined to be a focus, and the automatic focus adjustment is finished. When the adhesion of the focus detecting-system dust occurs, the focus detecting system dust is detected as a false defocus amount in a close-range direction. Therefore, when the focus detecting-system dust adheres to either of the two line sensors, the false defocus amount in the close-range direction is repeatedly detected regardless of how many times the detection of defocus amount and the driving of the focusing lens are repeated. Therefore, no focus is determined even though the focusing lens is driven a specified number of times.

In that case, the camera MPU 7 determines the adhesion of the focus detecting system dust, prohibits the corresponding line sensor from detecting the defocus amount, and stores information in the EEPROM 17 as the focus detecting system dust detection information, the information indicating to which of the line sensors the focus detecting system dust is adhered. From then on, the focus adjustment operation is performed only with the other line sensor. The camera MPU 7 corresponds to a focus detecting system dust detecting unit and a control unit storing the focus detecting system dust detection information in the EEPROM 17. Further, when an external PC is connected to the PC I/F unit 19, the camera MPU 7, which is the control unit, causes the focus detecting system dust detection information to be stored in the EEPROM 17 so that the external PC can read the information.

When the focus adjustment operation is performed only with the other line sensor, it becomes difficult to offer original performance for a subject causing a parallel contrast, that is, a line extending in the same direction as that of the other line sensor, or the far-and-near contention between the background and the subject itself. However, when capturing image data of an ordinary subject, troublesome conditions where focuses are detected with difficulty do not last at all times, and the automatic focus adjustment can be appropriately performed under normal capturing conditions.

Next, when the release switch SW2 is turned on, the camera MPU 7 performs a series of operations to capture image data. As a first step, the camera MPU 7 controls the mirror drive unit 10 to cause the main mirror 8 and the sub mirror 9 to retract. As a second step, the camera MPU 7 transmits an aperture drive instruction to the lens MPU 1 by communications, and the lens MPU 1 controls the aperture drive unit 4 to operate the aperture 5. As a third step, the camera MPU 7 controls the capturing unit 13 to generate captured image data. As a fourth step, the camera MPU 7 writes the captured image data in the memory card inserted into the storage unit 18 as a file. The series of the capturing operations is finished by performing the first to fourth steps.

The series of the capturing operations is finished by performing the first to fourth steps. When a user brings the camera to a repair center due to poor focusing or other failures after the capturing is finished, a worker conducts the following operations: the worker connects the PC I/F unit 19 to the PC 23 via a cable and starts a special-purpose PC application from the PC 23; the worker reads the focus detecting system dust detection information stored in the EEPROM 17, and when the dust detection information corresponding to a specified line sensor is stored, the worker removes the focus detecting system dust based on the information and deletes the focus detecting system dust detection information stored in the EEPROM 17.

In the above-described configuration, the focus detecting system dust detection information stored in the EEPROM 17 can only be removed by the worker. The configuration is based on the concept that the total line number of an actual phase difference type automatic focus detecting device is usually so large that several tens to several hundreds of line sensor pairs are provided, and the adhesion of the focus detecting system dust to some of the line sensor pairs does not cause any problems from a practical standpoint.

Further, when five subject regions are respectively arranged on the center part, the upper part, the lower part, the left part, and the right part of the photographic screen, where the subject regions are provided to achieve the cross phase difference AF and arranged in a staggered pattern, the total number of the line sensor pairs becomes 5×2×2=20. At that time, an error message may be displayed when the focus detecting system dust detection is performed for a specified line number or more. Further, when it is determined that the focus detecting system dust is adhered to each of line sensor pairs that are included in a specified region, an error message may also be displayed. Still further, the focus detecting system dust detection is performed again after the focus detection is performed a specified number of times or more, because the dust may be shifted due to a vibration caused by the capturing operation or the orientation of the camera. When no focus detecting system dust is detected at that time, the focus detecting system dust detection information may be deleted from the EEPROM 17.

Since the focus detecting system dust detection information is stored in the EEPROM 17 according to the above-described configuration, the worker of the repair center can acquire useful information about the failures and repair of a phase difference type automatic focus adjustment device.

That is, the above-described configuration eliminates the trouble of applying uniform light with no contrast to the focus detecting system to confirm whether an image signal output from a specified pixel is decreased for each of the line sensors, so as to find the adhesion of the focus detecting system dust.

Second Embodiment

According to a second exemplary embodiment, the following processing procedures are added to the series of image capturing operations of the first exemplary embodiment, which is performed when the release switch SW2 is turned on.

More specifically, the captured image data is written onto the memory card inserted into the storage unit 9 as the captured image file at the fourth step of the first embodiment. On the other hand, in the present embodiment, the camera MPU 7 reads data stored in the EEPROM 17 to acquire the focus detecting system dust detection information, and embeds the focus detecting system dust detection information in the captured image data as capturing information along with the captured image file at the fourth step. More specifically, the captured image file is embedded in the captured image data in the exchangeable image file format (EXIF) provided for a digital camera. The capturing information includes information about the camera model name, the capturing date and time, the shutter speed (Tv), the aperture value (Av), the ISO speed ratings, etc. There are specifications of the EXIF, which are referred to as MakerNote, where the manufacturer's original information can be embedded. The focus detecting system dust detection information is embedded in the MakerNote information. The series of image capturing operations is finished by performing the above-described first to fourth steps.

After the image capturing is finished, the user connects the PC I/F unit 19 to the external PC 23 via a cable, and starts the special-purpose PC application from the PC 23. Accordingly, the camera MPU 7 copies or transfers the captured image file stored in the memory card inserted into the storage unit 18 to the PC 23, and causes the captured image file to be displayed on the display screen of the external PC.

Figure 2:
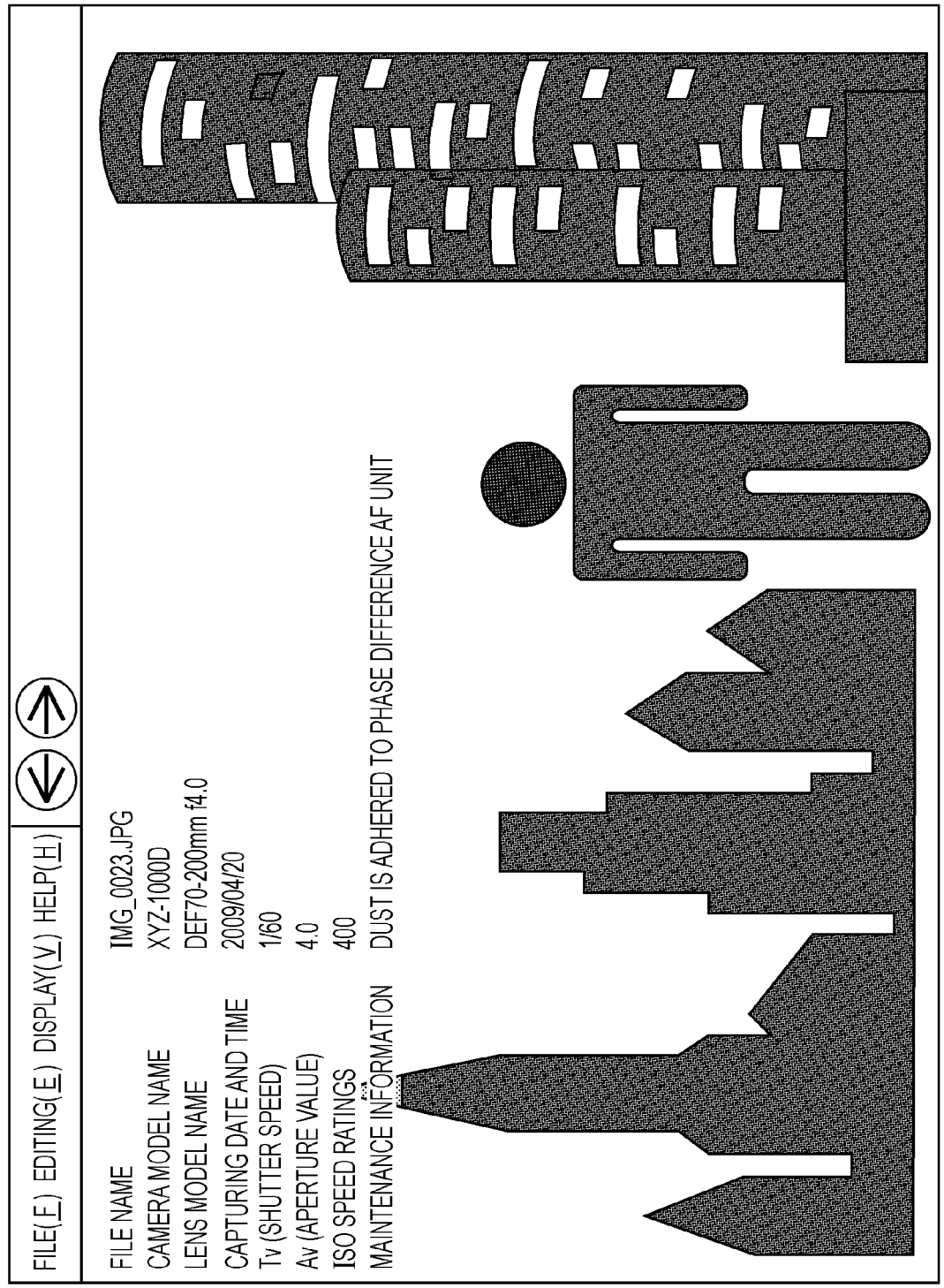
FIG. 2 illustrates exemplarily displayed captured image data according to a second embodiment of the present invention.

FIG. 2 illustrates the display screen of the external PC which is shown when the captured image file is opened with the special-purpose PC application. In addition to the file name, the file name information which is the EXIF information, and the capturing information indicating the camera model name, the lens model name, the capturing date and time, the shutter speed (Tv), the aperture value (Av), the ISO speed ratings, etc. are displayed on the display screen. Further, the focus detecting system dust detection information embedded in the MakerNote information is also read. When the adhesion of the dust is detected, the item "MAINTENANCE INFORMATION" and the message "DUST IS ADHERED TO PHASE DIFFERENCE AF UNIT" are displayed on the display screen.

Since the focus detecting system dust detection information is embedded in the captured image file in the above-described configuration, it becomes possible to establish association of the camera with the captured image file and notify the user of the focus detecting system dust detection information. Further, upon receiving the captured image file transmitted from the user, the worker of the repair center can acquire useful information about the failures and repair of the phase difference type automatic focus adjustment device.

Namely, the user can easily recognize, after the image capturing is finished, that it is difficult for the camera to offer its original performance after detecting the focus detecting system dust and removing the corresponding line sensor from the list of focus detection targets. Further, since the user should have knowledge of the camera and special-purpose tools to remove the focus detecting system dust, it is difficult for the user to remove the dust during the image capturing. The above-described configuration eliminates the trouble of being warned of the focus detecting system dust every time the automatic focus adjustment is executed during the capturing operations even though it is difficult for the user to remove the dust. Further, the above-described configuration saves the worker of the repair center from applying uniform light with no contrast to the focus detecting system to confirm whether an image signal output from a specified pixel is decreased for each of the line sensors, so as to find the adhesion of the focus detecting system dust.

Third Embodiment

Figure 3:
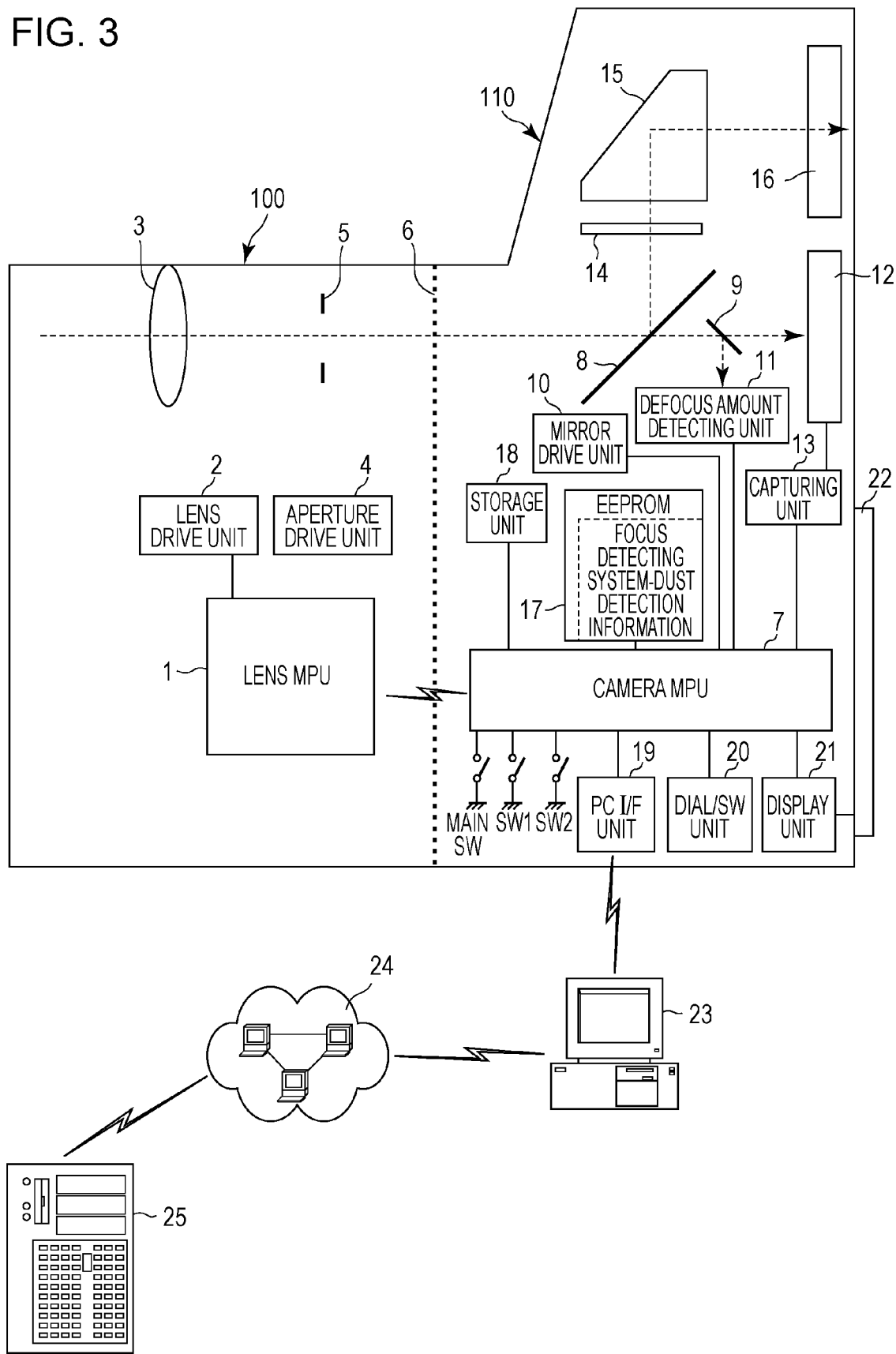
FIG. 3 is a block diagram illustrating a camera system according to a third embodiment of the present invention.

Although the special-purpose PC application is used to display the focus detecting system dust detection information in the first and second embodiments, a WEB browser which is an ordinary PC application may be started, and the focus detecting system dust detection information may be displayed on the WEB browser by a program running on a special-purpose WEB server 25 via the Internet 24 as illustrated in FIG. 3, which constitutes another exemplary embodiment of the present invention. The third exemplary embodiment can offer a remote diagnosis system for an interchangeable digital camera in addition to the same function as that of the special-purpose PC application. According to the remote diagnosis system, the worker of the repair center monitors access from the user to the WEB server 25, and offers descriptions to the user removing the focus detecting system dust on their own or asks the user to bring the camera to the repair center by using the communication function of the WEB browser 25.

Fourth Embodiment

Figure 4:
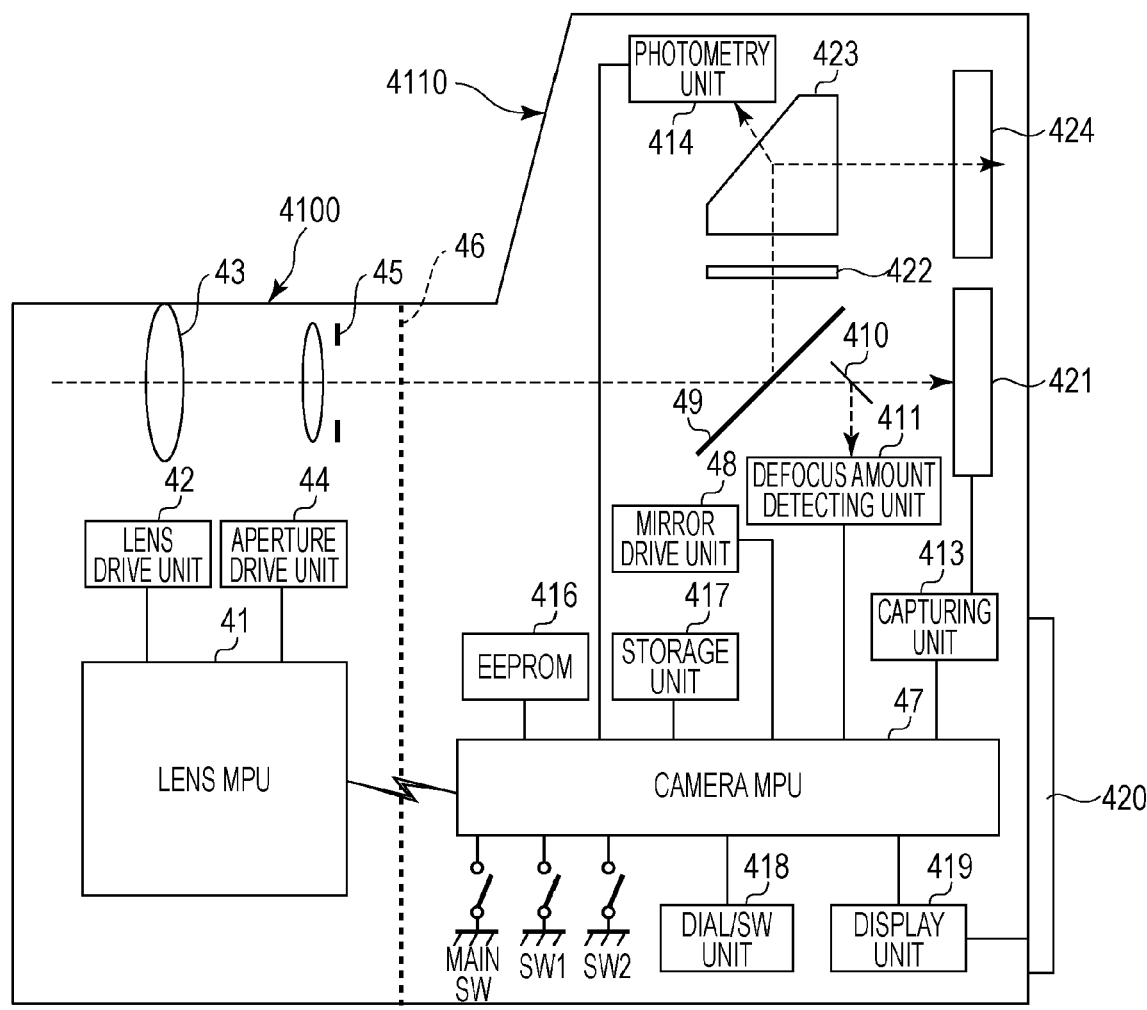
FIG. 4 is a block diagram illustrating an interchangeable digital camera according to a fourth embodiment of the present invention.

FIG. 4 is a block diagram illustrating an exemplary configuration of an interchangeable digital camera provided as an exemplary image capture apparatus according to another exemplary embodiment of the present invention. FIG. 4 illustrates a lens microprocessing unit (MPU) 4 performing control related to an interchangeable capturing lens 4100, a lens drive unit 42 provided to drive a focusing lens 43 of the capturing lens 4100, and an aperture drive unit 44 provided to drive an aperture 45.

The capturing lens 4100 includes the above-described lens MPU 41, lens drive unit 42, and aperture drive unit 44. Further, the capturing lens 4100 is connected in removable manner to a camera main body 4110 via a mount 46 as indicated by a dotted line illustrated in FIG. 4.

A camera MPU 47 performs control relating to the camera main body 4110. A mirror drive unit 48 causes a main mirror 49 and a sub mirror 410 that are arranged on the optical axis at the image capturing time to retract. A defocus amount detecting unit 411 is also provided. A defocus amount which is an out-of-focus amount used to perform the automatic focus adjustment is calculated based on data output from the defocus amount detecting unit 411.

Figure 5A:
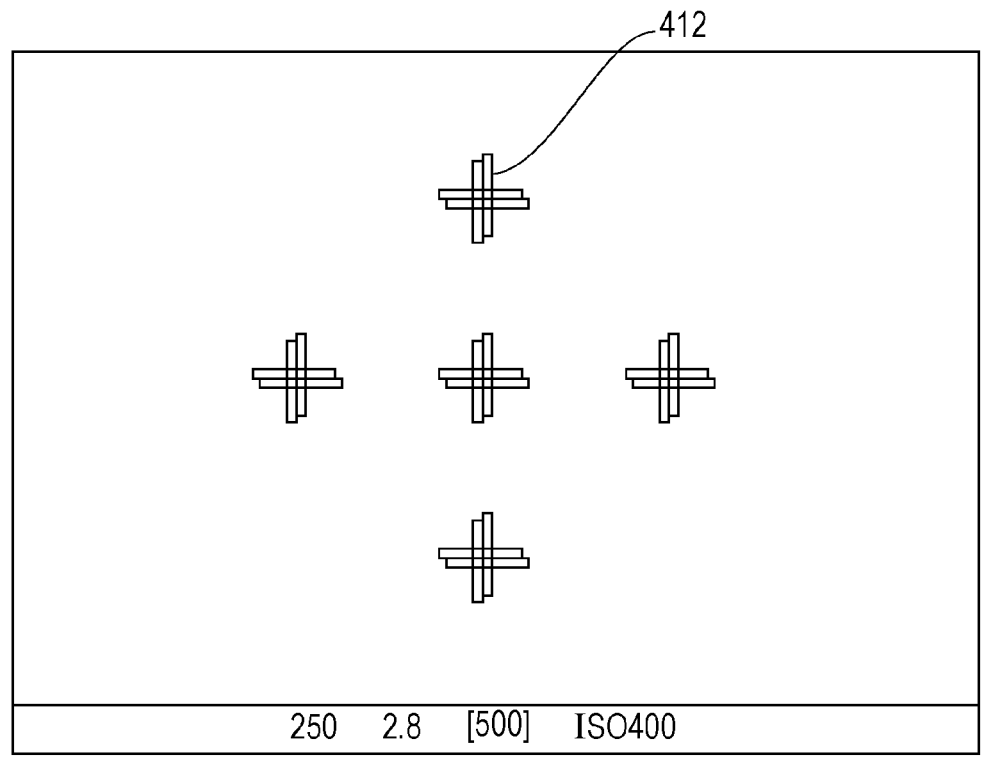
FIG. 5A illustrates focus detection regions according to the fourth embodiment.

In FIG. 5A, the area corresponding to a single line sensor pair is illustrated as a rectangle, and five focus detection regions 412 including the center part are set on the photographic screen. The defocus amount detecting unit 411 of the fourth embodiment can detect the focusing state at those five points. In each of the focus detection regions 412, two line sensor pairs are arranged in a staggered pattern in the vertical direction and the horizontal direction of the photographic screen. That is, the total number of the line sensor pairs arranged in the photographic screen becomes 5×2×2=20. Further, the number of pixels provided in a single line sensor pair is 100×2=200, and the total number of pixels of the defocus amount detecting unit 411 is 4000 for a monochrome image. The camera MPU 47 and the defocus amount detecting unit 411 constitute a focus detecting unit.

Figure 6:
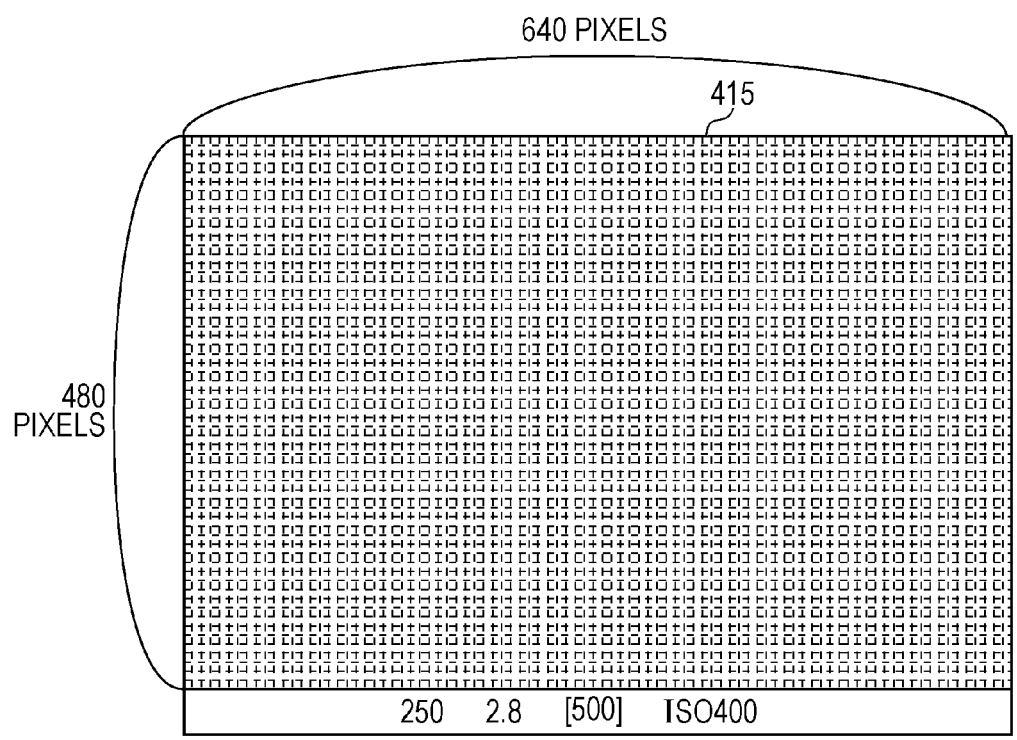
FIG. 6 illustrates a photometry region according to the fourth embodiment.

A capturing unit 413 generates the captured image data corresponding to 4800×3200=approx. 15,000,000 pixels for an RGB image with an image capture element 421. The capturing unit 413 constitutes an image capture unit configured to obtain a photographic screen to capture image. A photometry unit 414 generates and displays captured image data for a subject image obtained by a photometry optical system (not shown) on a photometry region 415 including 640×480=approx. 300,000 pixels for an RGB image as illustrated in FIG. 6, and determines automatic exposure executed considering the subject color. The photometry unit 414 constitutes an image capture unit obtaining captured image data for photometry. An EEPROM 416 is provided for a nonvolatile memory and stores information about various camera settings. A storage unit 417 stores captured image data in a removable memory card as a file.

A dial/switch (SW) unit 418 is provided to make various camera settings (focus detection mode, the shutter speed, the aperture value, the ISO speed ratings, etc.). A display unit 419 displays the various camera settings and captured image data on a display panel 420.

A main switch SW is turned on to start the camera MPU 47 and the lens MPU 41, and the camera system functions. A switch SW1 is turned on with a first stroke operation (half press) of the release button, and a switch SW2 is turned on with a second stroke operation (full press) of the release button. The automatic focus adjustment device operates when the switch SW1 is turned on.

Further, the display panel 420, an image capture element 421, a focusing plate 422, a pentaprism 423, and an optical finder 424 are provided.

The present exemplary embodiment will be described more specifically with reference to flowcharts of FIGS. 7 to 9.

Figure 7:
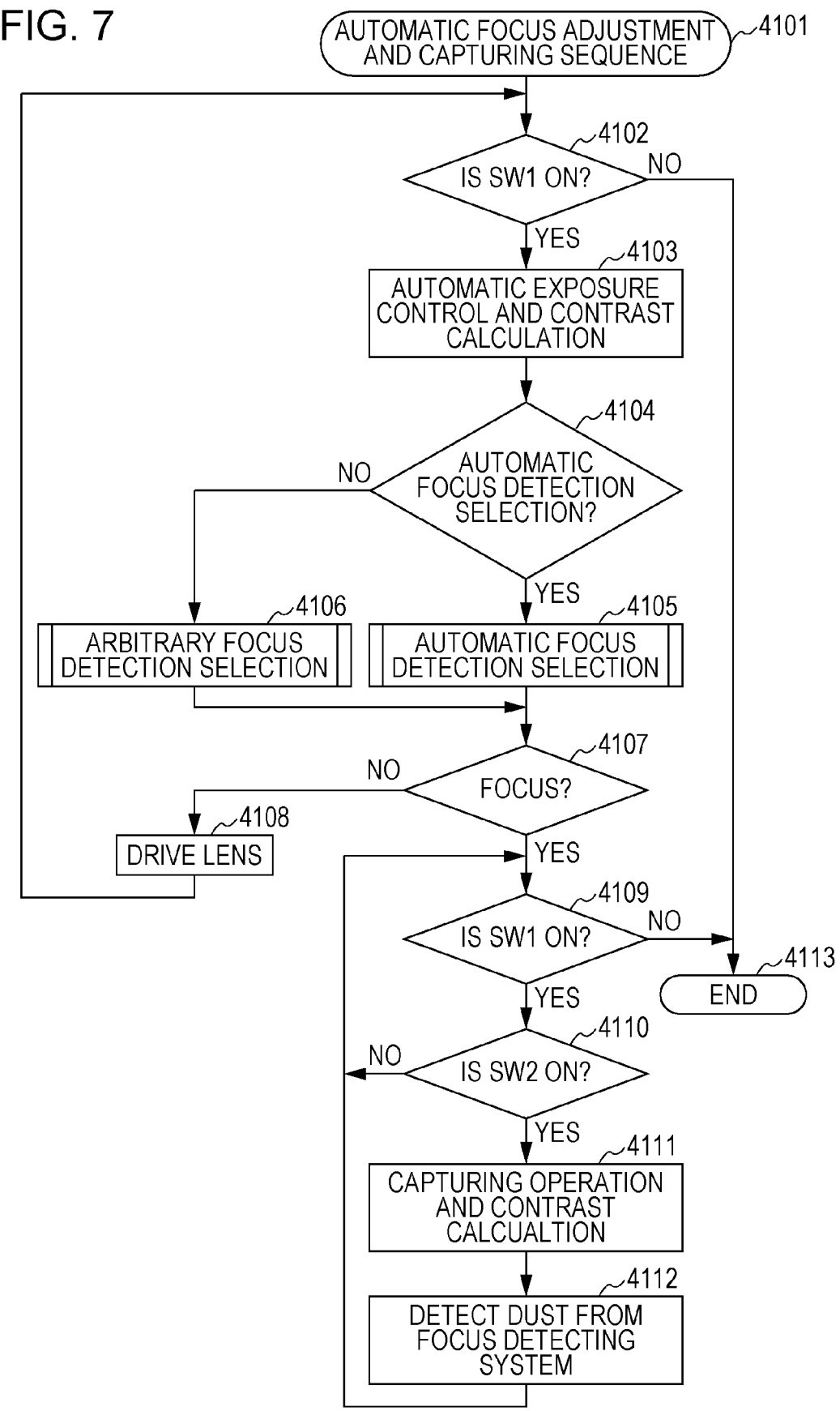
FIG. 7 is a flowchart illustrating an automatic focus adjustment and capturing sequence according to the fourth embodiment.

When the switch SW1 is turned on, the processing advances to step S101 illustrated in FIG. 7 to start processing procedures of the automatic focus adjustment and image capturing sequence. First, it is determined whether the switch SW1 is turned on at step S102. When the switch SW1 is not turned on, the processing advances to step S113 to finish the automatic focus adjustment. Otherwise, the processing advances to step S103 to perform the automatic exposure control and the contrast calculation. As illustrated in FIG. 6, the photometry unit 414 includes the photoelectric conversion elements with 640×480=approx. 300,000 pixels for an RGB image, generates captured image data for photometry, and determines automatic exposure executed considering the subject color. At the same time, the contrast of the pixels corresponding to the focus detection regions 412 to which the line sensor pairs that are arranged on the photographic screen as illustrated in FIG. 5A correspond is calculated based on the captured image data of the photometry unit 414 (hereinafter, the photometry contrast is referred to as a first contrast). The camera MPU 47 executing step S4103 constitutes a first contrast detecting unit.

Next, the processing advances to step S4104, and further advances to either step S4105 or step S4106 based on whether the focus detecting mode of the camera is set to "automatic selection" or "arbitrary selection". The expression "automatic selection" indicates that an appropriate region is automatically selected from among the five focus detection regions 412 illustrated in FIG. 5A, and the expression "arbitrary selection" indicates that one of the focus detection regions 412 is arbitrarily selected by the user operating the operation switch. The details of steps S4105 and S4106 are described below.

When the focus is successfully detected after steps S4105 and S4106 are finished, a defocus amount is calculated. Accordingly, it is determined in step S4107 whether the value of the defocus amount is less than or equal to a threshold value counted as a focus (often referred to as a focusing defocus width). If the defocus amount does not indicate any focus, the processing advances to step S4108 to perform the lens driving based on the defocus amount, and the processing procedures of steps S4102 to S4108 are repeated until a focus is achieved. Further, when the focus detection is finished in failure, it is also determined that no focus is achieved, the value of the lens drive amount is determined to be 0 so as not to drive the lens, and the processing procedures of steps S4102 to S4108 are repeated until a focus is achieved.

When it is determined that a focus is achieved at step S4107, the processing advances to step S4109 to newly determine whether the switch SW1 is turned on. When the switch SW1 is not turned on, the processing advances to step S4113 to finish the automatic focus adjustment. Otherwise, the processing advances to step S4110 to determine whether the switch SW2 is turned on.

When the switch SW2 is tuned on, the capturing operation and the contrast calculation are executed at step S4111. The capturing unit 413 generates captured image data with the image capture element 421 with 4800×3200=approx. 15,000,000 pixels for an RGB image. The captured image data is stored in a removable memory card inserted into the storage unit 417 as a file. At the same time, the contrasts of the pixels corresponding to the focus detection regions 412 to which the line sensor pairs that are arranged on the photographic screen as illustrated in FIG. 5A correspond are calculated based on the captured image data of the capturing unit 413 (hereinafter, the capturing contrast is referred to as a second contrast). The camera MPU 47 executing step S4111 constitutes a second contrast detecting unit.

Next, the processing advances to step S4112 to detect the focus detecting system dust, and the processing procedures of steps S4109 to S4112 are repeated until the switch SW1 is turned off.

Before describing the focus detecting system dust detection executed at step S4112, the details of "automatic focus detection selection" of the above-stated step S4105 and the details of "arbitrary focus detection selection" of step S4106 will be described with reference to flowcharts of FIGS. 8 and 9.

Figure 8:
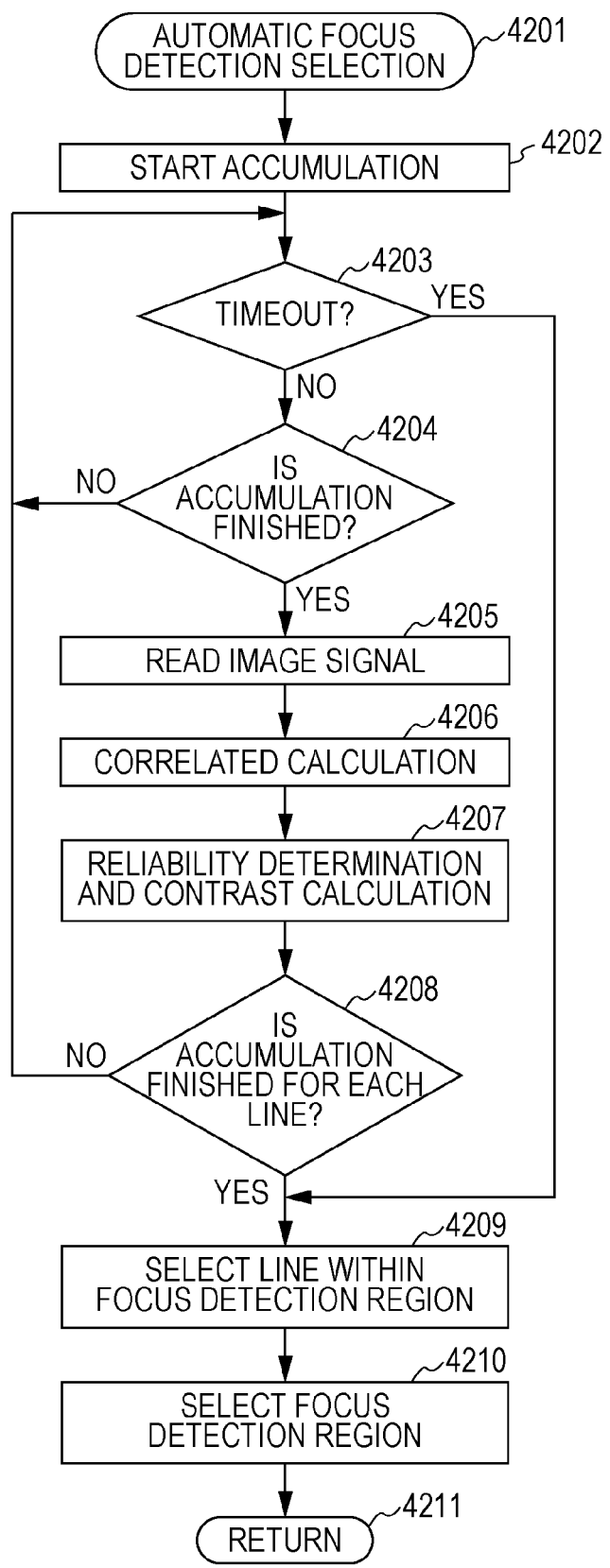
FIG. 8 is a flowchart illustrating an automatic focus detection selection according to the fourth embodiment.
Figure 9:
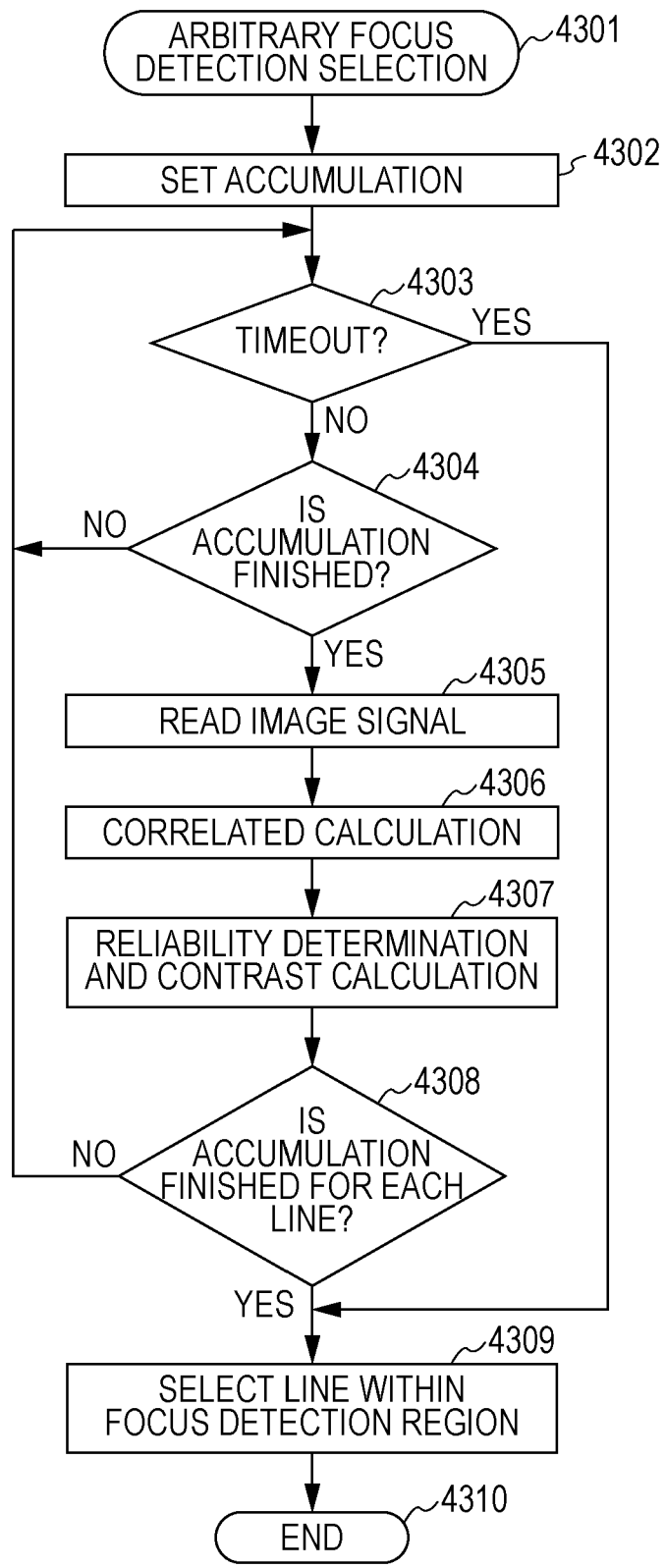
FIG. 9 is a flowchart illustrating an arbitrary focus detection selection according to the fourth embodiment.

First, when the processing of "automatic focus detection selection" is started at step S4201 illustrated in FIG. 8, accumulation control is started for each of the line sensor pairs of the defocus amount detecting unit 411 at step S4202. After starting the accumulation control at step S4202, the processing advances to step S4203 to determine whether a specified time-out time elapses since the accumulation is started. The line sensor pairs of the present embodiment stop the accumulation with an automatic gain control (AGC) circuit before a subject contrast which is adequate to detect a focus is generated between the pixels of the line sensors or an electric charge is saturated in any of the pixels. However, the accumulation is not completed when the subject contrast is small and the subject brightness is low. Accordingly, a time-out time causing no response problem from a practical standpoint is provided, and the accumulation is forcefully finished and the processing advances to step S4209 after the time-out time elapses.

On the other hand, when the time-out time does not elapses, the processing advances to step S4204 to determine whether the accumulation of any of the line sensor pairs is finished. When the accumulation is not finished, the processing returns to step S4203. Otherwise, the processing advances to step S4205 to read the image signal of the corresponding line sensor pair. Next, the processing advances to step S4206 to calculate the relative position-displacement amount of the image signal by correlated calculation, and a defocus amount is detected by performing an operation appropriate for the relative position-displacement amount. Then, the processing advances to step 4207 to perform the reliability determination and the contrast calculation.

The reliability is determined based on whether the value of the degree of agreement between subject images of the line sensor pairs is greater than or equal to a specified threshold value. When ghost light is made incident on the focus detecting system, for example, the subject images are deformed and the focus detection precision is significantly decreased. Therefore, when the value of the degree of agreement between the subject images is less than the specified threshold value, the focus detection is disabled even though a defocus amount is detected. Next, the contrast of the line sensor pair is calculated (hereinafter, the focus detection contrast is referred to as a third contrast). The camera MPU 7 executing step S4207 constitutes a third contrast detecting unit. When the subject has a low contrast or no contrast, the focus detection precision is significantly decreased. Therefore, the focus detection is also disabled when the contrast value is less than a specified threshold value. Further, the focus detection is also disabled for a line sensor pair from which the focus detecting system dust is detected.

The processing advances to step S4208 to determine whether the accumulation is finished for each of the line sensor pairs. When the accumulation is not finished, the processing procedures of steps S4203 to S4208 are repeated. Otherwise, the processing advances to step S4209 to determine which of the defocus amounts calculated with the line sensor pairs should be selected, so as to determine the final defocus amount of the focus detection region 412 based on the selected defocus amounts. More specifically, except in cases where the focus detection is not disabled, the defocus amounts of two line sensor pairs including two line sensors arranged in the horizontal direction and two line sensors arranged in the vertical direction are averaged, and a horizontal defocus amount and a vertical defocus amount are respectively obtained. Next, the amount of a defocus occurring in a direction from which a closer defocus amount is detected is determined to be a definitive defocus amount, because a defocus amount which is least affected by the background, etc. (the contention between far and near subjects) becomes the closer defocus amount.

After determining the defocus amount for each of the five focus detection regions 412 at step S4209, the processing advances to step S4210 to select a definitive focus detection region. According to a selection method of the present embodiment, a focus detection region indicating the amount of a closer defocus is selected from among focus detection regions for which the focus detection is not disabled by the empirical rule stating that the closest subject has high potential for becoming the main subject. According to FIG. 5B, for example, there is a person in front of a building of the background, and the face of the person is shown forward of his abdomen. Accordingly, regardless of in which position the range ring of the capturing lens is set, the amount of defocus detected from a focus detection region defined in the center is closer than those of lower and left focus detection regions. On the other hand, the focus detection is disabled for upper and right focus detection regions, because the upper and right focus detection regions offer no contrast. Consequently, the defocus amount of the center focus detection region becomes the definitive defocus amount.

Thus, the defocus amount of the "automatic focus detection selection" is determined, and the processing returns to step S4107 at step S4211.

Next, the details of "arbitrary focus detection selection" of step S4106 will be described with reference to the flowchart of FIG. 9. Since many of processing procedures of "arbitrary focus detection selection" are equivalent to those of "automatic focus detection selection" illustrated in FIG. 8, descriptions are provided only for the difference therebetween. Firstly, when making settings on the accumulation performed at step S4302, the accumulation control is started only for line sensor pairs included in a focus detection region selected by the user operating the operation switch of the line sensor pairs of the defocus amount detecting unit 411. Secondly, since the user selects one of the focus detection regions 412 by operating the operation switch, the processing corresponding to the focus detection region selection made at step S4210 illustrated in FIG. 8 becomes unnecessary.

Thus, the processing procedures of the automatic focus adjustment and image capturing sequence have been described. Additionally, the above-described focus detecting system dust detection executed at step S4112 will be described. At step S4112, the photometry contrast, the capturing contrast, and the focus detection contrast had already been calculated, respectively.

Figure 5B:
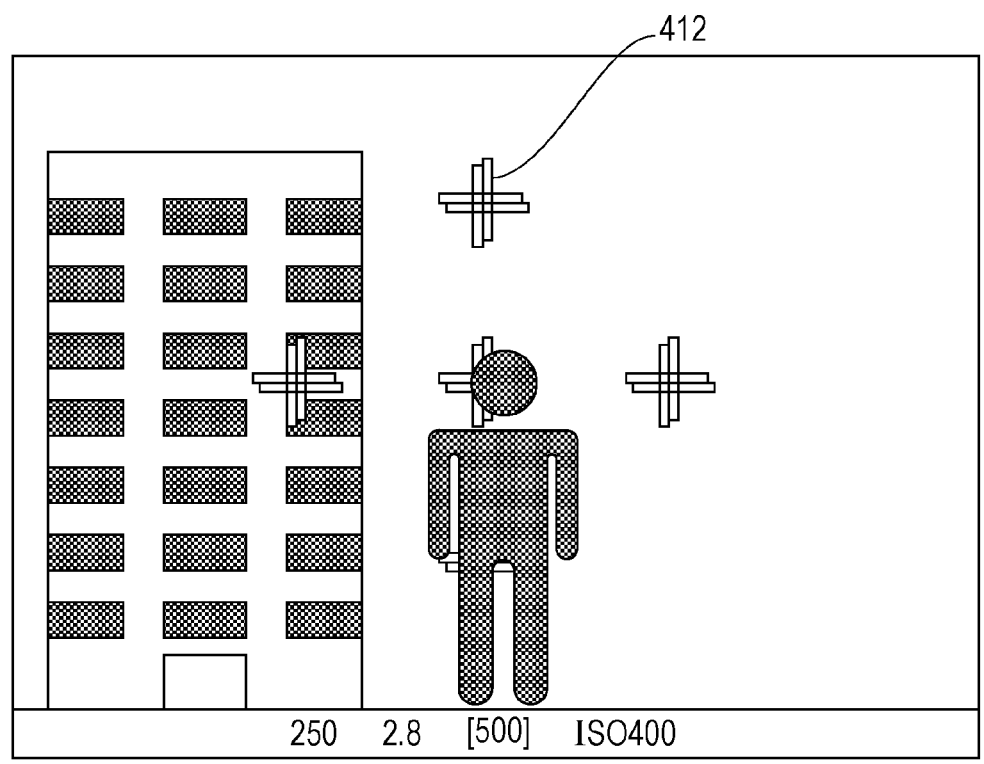
FIG. 5B also illustrates the focus detection regions according to the fourth embodiment.

According to an example illustrated in FIG. 5B, no contrast is offered in the upper and right focus detection regions as described above, so that the values of the three contrasts are usually smaller than specified threshold values, respectively. Therefore, when the value of the focus detection contrast is larger than the specified threshold value even though the value of either the photometry contrast or the capturing contrast is smaller than the specified value, dust adhered to the focus detecting system is detected and information about the detection is stored. From then on, therefore, the focus detection is disabled for the corresponding line sensor pair (focus detection region).

As a matter of course, the focus detecting system dust may be shifted due to the capturing operations or the cleaning performed by the user through the use of an airbrush. Therefore, when the value of the photometry contrast or the capturing contrast is smaller than the specified threshold value and that of the focus detection contrast is smaller than the specified threshold value in the line sensor pair from which the focus detecting system dust had once been detected, it is determined that the focus detecting system dust is lost and information about the loss is stored. Further, the focus detection that had been disabled for the corresponding line sensor pair is enabled again.

As described above, either of the photometry contrast and the capturing contrast is considered, because the focus detecting system dust may be adhered to the photometry unit 414 and the capturing unit 413. When the value of the contrast of one of the units 414 and 413 exceeds a specified value due to the dust adhesion, the other unit can correctly detect the focus detecting system dust.

The present embodiment allows for comparing the presence and the absence of contrasts for a plurality of image capture units (the photometry unit 414 and the capturing unit 413) obtaining captured image data for an object other than the focus detection in a specified region of the captured image data. Accordingly, the focus detecting system dust can be detected correctly even though the focusing lens is not actually driven by the camera. Further, the focus detecting system dust can be correctly detected even though only a piece image of the line sensor pair is affected by a reflection of the focus detecting system dust. Still further, the focus detecting system dust can be correctly detected irrespective of whether or not a subject is moving.

Further, of a plurality of the defocus amount detecting units, the focus adjustment operation performed based on the focus detection result of a line sensor pair from which the focus detecting system dust is detected is prohibited. Accordingly, the focus detection can be correctly performed through the use of the other line sensor pairs.

Further, for a line sensor pair from which the focus detecting system dust had once been detected, the disabled focus detection is enabled again when the focus detecting system dust is lost. Accordingly, the focus detection can be performed with increased precision. The present embodiment allows for detecting the dust in the focus detection regions that are defined on the photographic screen based on the presence or absence of contrast in a plurality of image capture units (the photometry unit, the focus detecting unit, and the capturing unit). However, in another exemplary embodiment, the focus detecting system dust may be detected by analyzing captured image data of the image capture units and comparing the similarities of the contrasts of captured image data of the image capture units.

Fifth Embodiment

In the fourth embodiment, it is determined that there is no contrast in a specified region of captured image data when the user performs an ordinary capturing operation, and the focus detecting system dust is detected at the determination time.

In a fifth exemplary embodiment, the user (photographer) deliberately captures image data with no contrast (the blue sky, a plain sign without a pattern, a gray reflective plate, etc.) to detect the focus detecting system dust.

Figure 10:
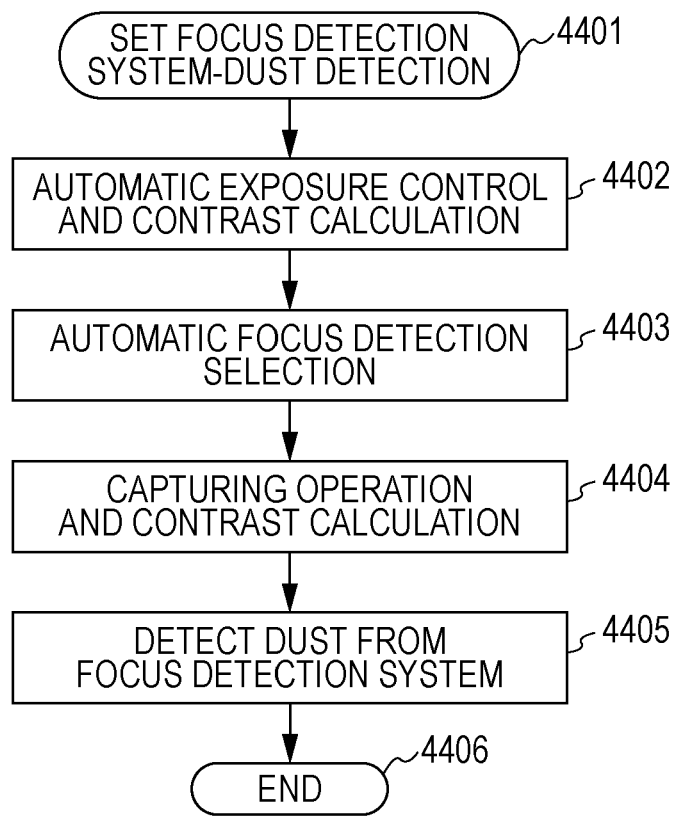
FIG. 10 is a flowchart illustrating operations that are performed in focus detecting system dust detection mode according to a fifth embodiment of the present invention.
Figure 11:
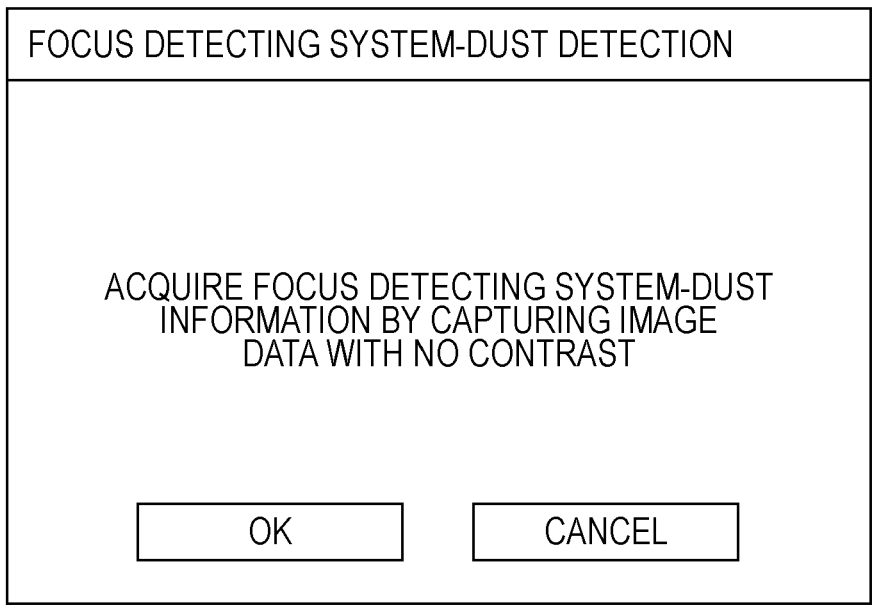
FIG. 11 illustrates a focus detecting system dust detection mode setting screen according to the fifth embodiment.

The fifth embodiment will be described more specifically with reference to the flowchart of FIG. 10. The display unit 419 enters "focus detecting system dust detection mode" as illustrated in FIG. 11 when the user operates the operation switch and the processing advances to step S4401 when the user presses an OK button. Next, the automatic exposure control and the contrast calculation are performed at step S4402, the automatic focus detection selection is made at step S4403, the capturing operation and the contrast calculation are performed at step S4404, and the focus detecting system dust detection is performed at step S4405, whereby the processing procedures are finished. The processing procedures that are performed at steps S4402, S4403, S4404, and S4405 are equivalent to those of steps S4103, S4105, S4111, and S4112 of FIG. 11, respectively.

The fifth embodiment allows for detecting the focus detecting system dust at the same time as when the user deliberately captures image data with no contrast. In the fourth embodiment, the presence or absence of a contrast of the region corresponding to a line sensor pair is determined during the capturing operation. Therefore, it is not certain whether the focus detecting system dust can be detected with a single capturing operation. On the other hand, since it can be expected, in advance, that there is no contrast in a specified region of the captured image data corresponding to each of the line sensor pairs in the fifth embodiment, the focus detecting system dust can be detected with increased precision.

Figure 12A:
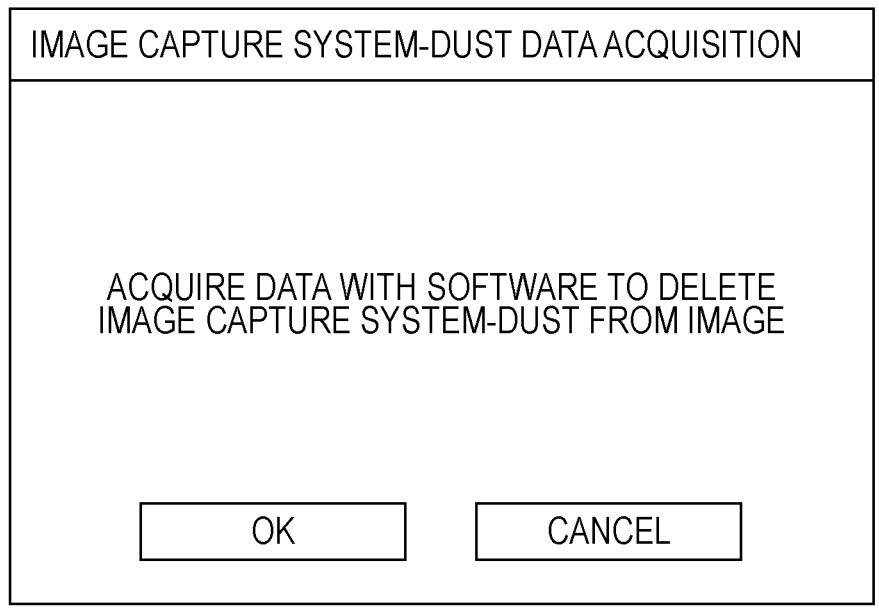
FIG. 12A illustrates capture system dust data acquisition mode setting screen according to the fifth embodiment.
Figure 12B:
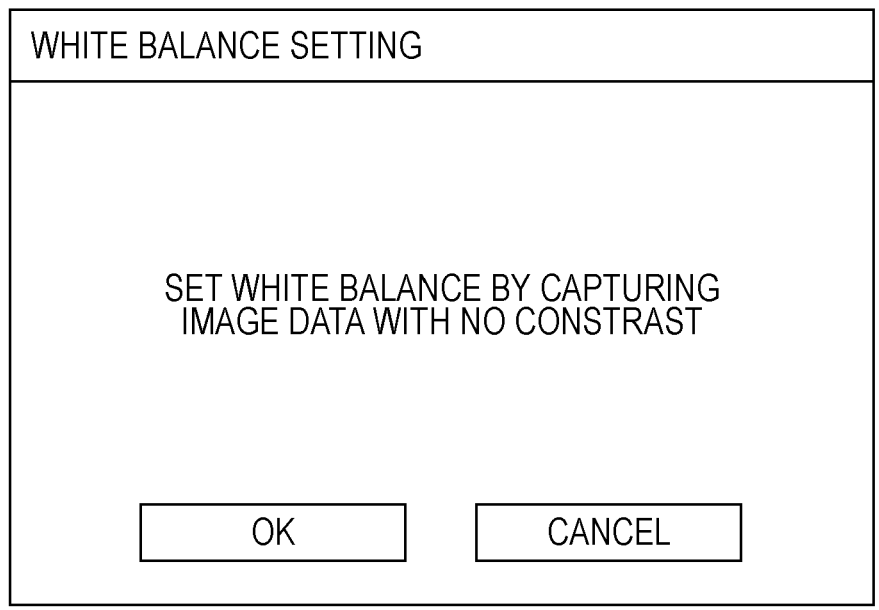
FIG. 12B illustrates white balance setting mode setting screen according to the fifth embodiment.
Figure 13:
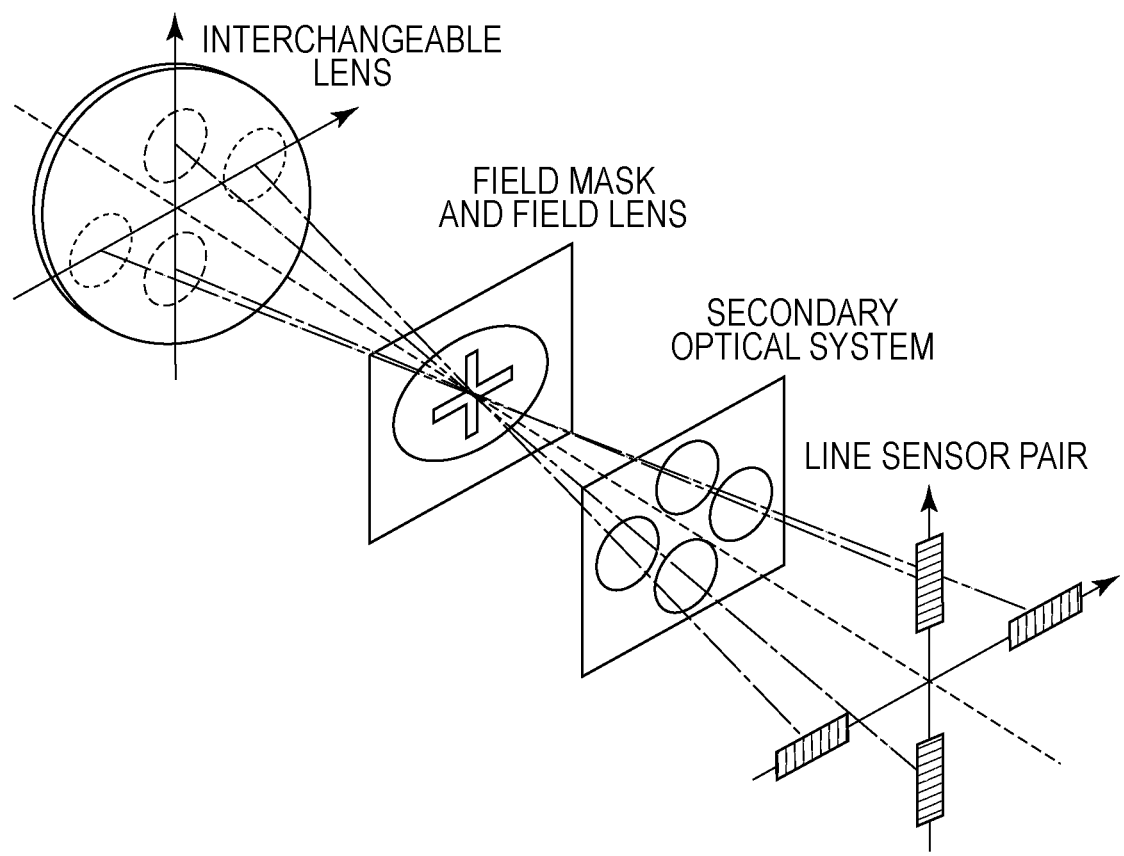
FIG. 13 illustrates an ordinary focus detecting optical system.
Figure 14A:
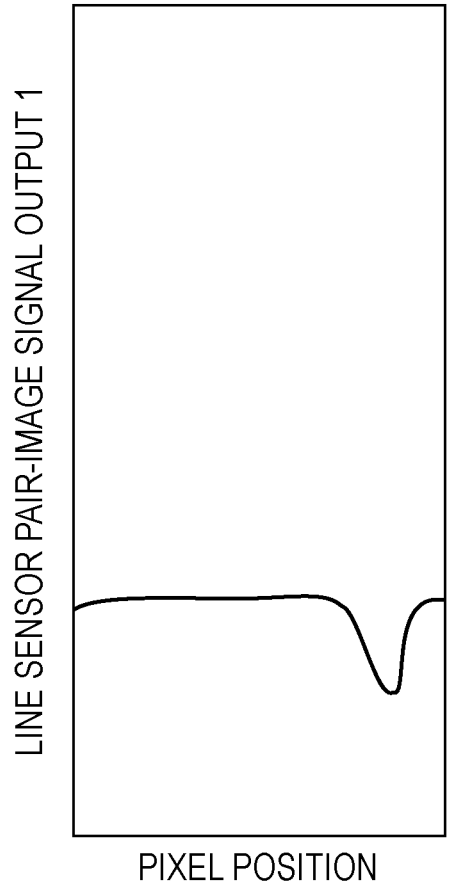
FIG. 14A illustrates an image signal output obtained when the focus detecting system dust is adhered to a line sensor pair.
Figure 14B:
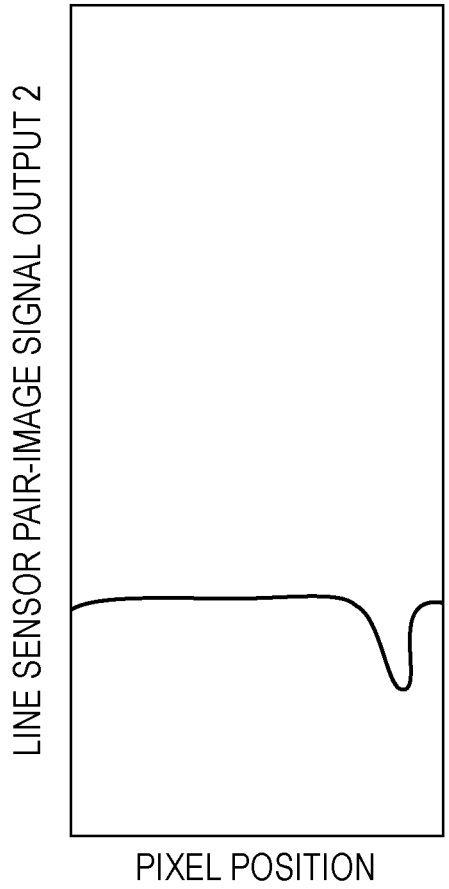
FIG. 14B illustrates another image signal output obtained when the focus detecting system dust is adhered to the line sensor pair.
Figure 15A:
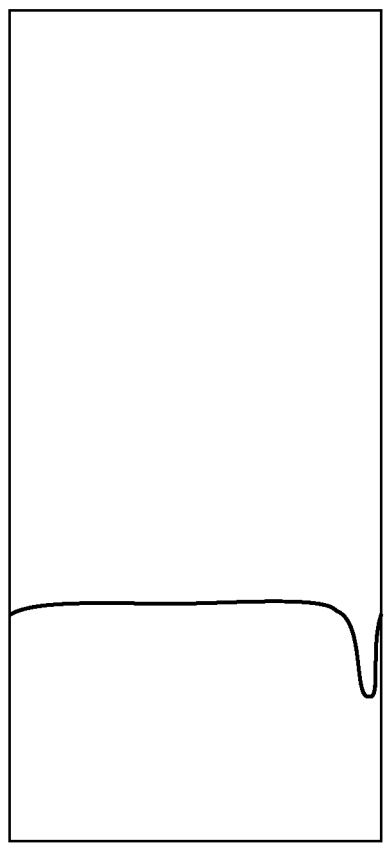
FIG. 15A illustrates an image signal output obtained when the focus detecting system dust is reflected in a piece image of a line sensor pair.
Figure 15B:
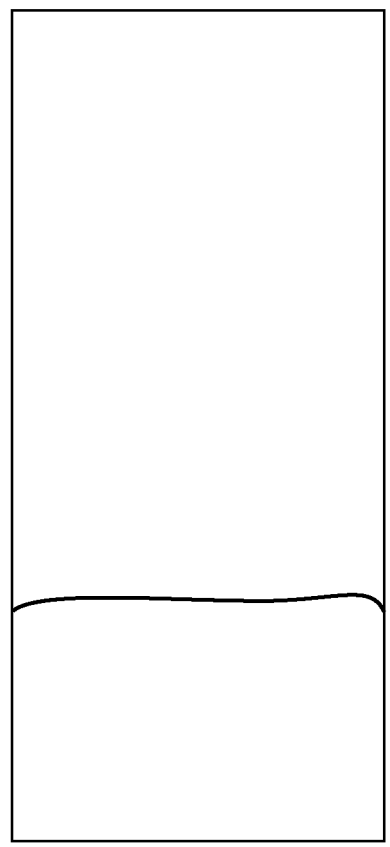
FIG. 15B illustrates another image signal output obtained when the focus detecting system dust is reflected in a piece image of the line sensor pair.

Although the special-purpose mode is provided to detect the focus detecting system dust in the fifth embodiment, in another exemplary embodiment, different functions provided to capture image data with no contrast can also serve as the special-purpose mode. More specifically, since the user deliberately captures image data with no contrast in image capture system dust data acquisition mode illustrated in FIG. 12A and white balance setting mode illustrated in FIG. 12B, the focus detecting system dust may be detected when those functions are operated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-030012 filed Feb. 15, 2011 and No. 2011-067811 filed Mar. 25, 2011, which are hereby incorporated by reference herein in their entirety.

What is claimed is:

1. An image capture apparatus, which includes a focus detecting system configured to output a signal for adjusting a focus state of a lens unit against an image, comprising:
   a detecting unit configured to detect dust information related to the focus detecting system; and
   a controller configured to perform control so that captured image information is stored in a memory,
   wherein the controller performs control so that the dust information is stored, in association with the image information, in the memory.

2. The image capture apparatus according to claim 1, wherein the controller embeds the detected focus detecting system dust information in the captured image information stored in the memory.

3. The image capture apparatus according to claim 2, further comprising an interface unit to be connected to an external apparatus,
   wherein when the external apparatus is connected to the interface unit, the controller causes a photographic screen, where the detected focus detecting system dust information is embedded, to be displayed on a display screen of the external apparatus.

4. The image capture apparatus according to claim 1, further comprising an interface unit to be connected to an external apparatus,
   wherein when the external apparatus is connected to the interface unit, the controller performs control to store the detected focus detecting system dust information in the memory so that the detected focus detecting system dust information can be read by the external apparatus.

5. The image capture apparatus according to claim 1, wherein the captured image information is acquired by capturing the image via an optical path different from the optical path of the focus detecting system.

* * * * *